(12) United States Patent
Hashimoto et al.

(10) Patent No.: US 9,042,553 B2
(45) Date of Patent: May 26, 2015

(54) COMMUNICATING DEVICE AND COMMUNICATING METHOD

(75) Inventors: Mikio Hashimoto, Tokyo (JP); Shinji Yamanaka, Tokyo (JP); Yuichi Komano, Kawasaki (JP); Taku Kato, Kamakura (JP); Hiroshi Isozaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 59 days.

(21) Appl. No.: 13/234,518

(22) Filed: Sep. 16, 2011

(65) Prior Publication Data

US 2012/0224695 A1    Sep. 6, 2012

(30) Foreign Application Priority Data

Mar. 3, 2011    (JP) .................. 2011-046757

(51) Int. Cl.
*H04L 9/08* (2006.01)

(52) U.S. Cl.
CPC ............ *H04L 9/0894* (2013.01); *H04L 9/0825* (2013.01); *H04L 9/0869* (2013.01)

(58) Field of Classification Search
USPC ......... 713/171, 194, 324, 1, 2, 100, 170, 176, 713/179–181; 380/277, 47, 278–285, 44; 705/71, 55, 56; 711/164
See application file for complete search history.

(56) References Cited

U.S. PATENT DOCUMENTS

| | | | | |
|---|---|---|---|---|
| 6,047,242 A * | 4/2000 | Benson | ........................... | 702/35 |
| 6,105,012 A * | 8/2000 | Chang et al. | ................... | 705/64 |
| 6,601,172 B1 * | 7/2003 | Epstein | ......................... | 713/178 |
| 6,651,171 B1 * | 11/2003 | England et al. | ............... | 713/193 |
| 7,136,997 B2 * | 11/2006 | Yamaguchi et al. | .......... | 713/155 |
| 7,143,436 B2 * | 11/2006 | Yamaguchi et al. | .............. | 726/6 |
| 7,240,345 B2 * | 7/2007 | Sueyoshi et al. | .............. | 717/161 |
| 7,299,356 B2 * | 11/2007 | Mizrah | ......................... | 713/169 |
| 7,310,821 B2 * | 12/2007 | Lee et al. | ........................ | 726/27 |

(Continued)

FOREIGN PATENT DOCUMENTS

| | | | | |
|---|---|---|---|---|
| JP | 2002244757 A * | 8/2002 | ............... | G06F 1/00 |
| JP | 2007-249996 | 9/2007 | | |

OTHER PUBLICATIONS

"PIC32MS Flash Programming Specification", Microchip Technology Inc., 2010, ISBN:978-1-60932-150-5.

(Continued)

*Primary Examiner* — Dede Zecher
*Assistant Examiner* — Richard McCoy
(74) *Attorney, Agent, or Firm* — Amin, Turocy & Watson, LLP

(57) ABSTRACT

The debugging unit writes a public key of the key issuing server and an initializing program given from outside, to the storage unit. The instruction executing unit reads and executes the initializing program stored in the storage unit. The debug disabling unit disables the debugging unit. The public-key encrypting unit encrypts the random number by the public key in the storage unit, the random number generated by the random number generating unit after the debugging unit is disabled. The transmitting unit transmits the encrypted random number to the key issuing server. The receiving unit receives an individual key encrypted by the random number from the key issuing server. The individual-key writing unit decrypts the encrypted individual key by the random number to obtain the individual key and write the individual key to the storage unit.

6 Claims, 6 Drawing Sheets

(56) References Cited

U.S. PATENT DOCUMENTS

| | | | |
|---|---|---|---|
| 7,343,496 B1* | 3/2008 | Hsiang et al. | 713/194 |
| 7,555,464 B2* | 6/2009 | Candelore | 705/59 |
| 7,702,921 B2* | 4/2010 | Ciesinger | 713/193 |
| 7,707,418 B2* | 4/2010 | Tsushima et al. | 713/170 |
| 7,707,645 B2* | 4/2010 | Haruki et al. | 726/27 |
| 7,873,168 B2* | 1/2011 | Tateoka et al. | 380/282 |
| 7,937,587 B2* | 5/2011 | Yoshida | 713/168 |
| 7,953,989 B1* | 5/2011 | Hsiang et al. | 713/194 |
| 7,958,370 B2* | 6/2011 | Hirai et al. | 713/189 |
| 8,205,083 B2* | 6/2012 | Suu et al. | 713/169 |
| 8,307,208 B2* | 11/2012 | Matsuo | 713/171 |
| 8,332,641 B2* | 12/2012 | Case et al. | 713/168 |
| 2002/0007453 A1* | 1/2002 | Nemovicher | 713/155 |
| 2003/0061516 A1 | 3/2003 | Yamaguchi et al. | |
| 2003/0061518 A1 | 3/2003 | Yamaguchi et al. | |
| 2007/0086345 A1* | 4/2007 | Yashima et al. | 370/236 |
| 2009/0075630 A1* | 3/2009 | McLean | 455/411 |
| 2009/0307495 A1* | 12/2009 | Matsuo | 713/171 |
| 2010/0046746 A1* | 2/2010 | Yonemura et al. | 380/30 |
| 2010/0125735 A1* | 5/2010 | Zapata et al. | 713/170 |
| 2010/0211779 A1* | 8/2010 | Sundaram | 713/168 |
| 2011/0040964 A1* | 2/2011 | Nussbaum et al. | 713/155 |
| 2011/0055567 A1* | 3/2011 | Sundaram et al. | 713/169 |
| 2011/0071841 A1* | 3/2011 | Fomenko et al. | 705/1.1 |
| 2011/0213983 A1* | 9/2011 | Staugaitis et al. | 713/176 |
| 2011/0246767 A1* | 10/2011 | Chaturvedi et al. | 713/164 |
| 2012/0008766 A1* | 1/2012 | Robertson et al. | 380/28 |
| 2012/0023336 A1* | 1/2012 | Natarajan | 713/179 |
| 2012/0143767 A1* | 6/2012 | Abadir | 705/64 |
| 2012/0143772 A1* | 6/2012 | Abadir | 705/75 |
| 2012/0198243 A1* | 8/2012 | Matsushima et al. | 713/193 |
| 2012/0260095 A1* | 10/2012 | Von Hauck et al. | 713/176 |

OTHER PUBLICATIONS

"DS5250 High-Speed Secure Microcontroller Data Sheet", 2010.
Chen, Jyh-CHeng, et al., "Extensible Authentication Protocol (EAP) and IEEE 802.1x: Tutorial and Empirical Experience", IEEE Radio Communications, 2005, S26-S32.

* cited by examiner

COMMUNICATING DEVICE AND COMMUNICATING METHOD

CROSS REFERENCE TO RELATED APPLICATIONS

This application is based upon and claims the benefit of priority from the prior Japanese Patent Application No. 2011-046757, filed on Mar. 3, 2011, the entire contents of which are incorporated herein by reference.

FIELD

An embodiment of the present invention relates to a communicating device and a communicating method and particularly relates to a technique for safely obtaining an individual key from a key issuing server.

BACKGROUND

There is known a product having a program protecting function which disables a port for program-writing and debugging of a microcomputer on-chip memory after writing a program in order to prevent the know-how of written software from being leaked and prevent a third person from carrying out unauthorized modification in a one-chip microcomputer for an embedded device.

Also, a product having key information and cryptography hardware in a chip is known as a CPU for a security device; however, such a product is generally expensive due to key management cost and small production quantity. Also, there is known a mechanism in which a memory dump and a debugging function are used by a developer in a development process so as to prevent confidential information from being fraudulently obtained.

In the case in which the product having the above described program protecting function is applied to a device having a secret key (individual key) for authentication, when the debug port is disabled after the secret key is written to a built-in memory of a chip together with software, the secret key thereafter is safe unless a special technique such as chip analysis is applied.

However, if the above described method is simply applied, it is not safe with respect to the threat of internal fraudulent persons since the secret key is handled in plain text in the manufacturing process thereof. In a low-price microcomputer, the method that simply encrypts write data cannot be applied since no secret key is provided in the first place not to mention the multilevel key management employed in a manufacturing process of an IC card. A method capable of safely carrying out secret key writing is required also for a system to which such a microcomputer is applied.

DETAILED DESCRIPTION

Figure 1:
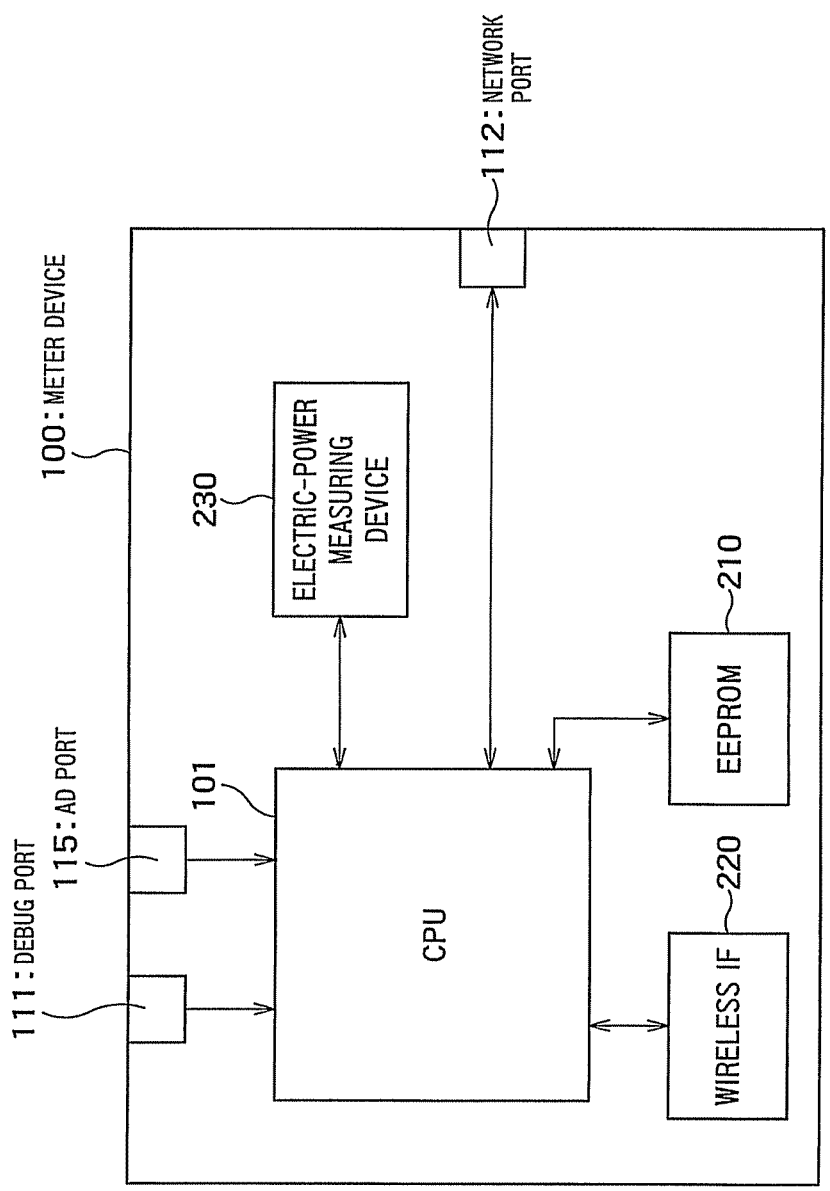
FIG. 1 is a block diagram showing a hardware configuration of a meter device according to an embodiment.

According to an aspect of the present invention, there is provided with a communicating device.

The communicating device includes a storage unit, a debugging unit, an instruction executing unit, a random-number generating unit, a debug disabling unit, a public-key encrypting unit, a transmitting unit, a receiving unit and an individual-key writing unit.

The debugging unit writes a public key of the key issuing server and an initializing program given from outside, to the storage unit.

The instruction executing unit reads and executes the initializing program stored in the storage unit.

The random-number generating generates a random number.

The debug disabling unit disables the debugging unit by the initializing program being executed.

The public-key encrypting unit encrypts the random number by the public key in the storage unit by the initializing program being executed, the random number generated by the random number generating unit after the debugging unit is disabled.

The transmitting unit transmits the encrypted random number to the key issuing server by the initializing program being executed.

The receiving unit receives an individual key encrypted by the random number from the key issuing server by the initializing program being executed.

The individual-key writing unit decrypts the encrypted individual key by the random number to obtain the individual key and write the individual key to the storage unit, by the initializing program being executed.

The present embodiment explained below provides a mechanism which safely embeds and retains an individual key to be used in communication (encryption, authentication) with a server in the side of an electric power company in a manufacturing process of a meter device to be installed in a house of an end-user.

After the individual key is safely written by the present embodiment in the manufacturing process, the meter device finally is shipped from the manufacturer and is installed in the house of the end-user. The meter device installed in the house is subjected to the operation of measuring the power consumption of equipment in the house and notifying an electric-power measuring server of the meter measurement results via a network or subjected to the operation of, for example, adjusting the amount of electric power supply based on control messages from an electric-power measuring server.

The individual key written to the meter device functions as the root of trust in mutual authentication in the communication between the server thereof and the meter device. For example, in the case in which 802.1x/TLS is utilized as a method of client authentication in a LAN, when authentication is carried out based on the individual key of the meter device, intrusion of an unauthorized device, which does not have the legitimate individual key, into a network and the attack that an unauthorized device impersonates a different meter device can be eliminated.

Therefore, such an individual key requires secrecy.

During the operations after the meter device is disposed in the user-end house, the individual key stored in a non-volatile memory in a CPU is safe against attacks from the outside.

Specifically, the direct access to the internal memory (non-volatile memory) can be disabled by prohibiting the debugger function in the manner described in the section of background techniques even if an attacker obtains the meter device during operation. In this state, advanced techniques such as chip physical analysis or side channel attack are required to obtain the secret key written therein, and the individual key serving as the root of trust is safe against attacks. Although there is communication via a network interface, the individual key is not at risk of leakage as long as the selection and implementation of a protocol for communication with outside are appropriate.

However, when focusing on the manufacturing process, there is a large risk. In the manufacturing process, the level of safety often stays only in countermeasures against efficient attacking methods which can be easily implemented, and the countermeasures are not enough in many cases even when the countermeasures for safety are provided.

Depending on the characteristics of attacks, the degrees of difficulty of countermeasures are different. The integrity (falsification prevention) of data write to a device and protection of confidentiality have the following characteristics. First, the records of writing processes of respective devices in manufacturing processes are controlled for quality management, and the records remain in many cases. Falsification of information leaves a record; therefore, the possibility that the attack will be found out is high. Executing falsification of information is more difficult than stealing information. On the other hand, in the case in which a file operation on a key writing device is required, when the operation of creating a partial copy of file contents or copying an entire file is carried out by an operator as a non-routine process, the attack of taking away the information can be carried out comparatively easily, and the record thereof is not left in many cases since it is a non-routine process. There are some methods for preventing such take-away of files; however, the methods take cost and require high-level people management. For example, even when a rule such as USB memory connection prohibition is set or the device side is configured to prohibit USB memory connection, these are changed in many cases because of on-site demands. Production of the devices is a labor-intensive process and is often transferred to another factory due to process restructuring. Therefore, it is difficult to control the people management of the production site at a high level.

Therefore, the present embodiment provides a mechanism which safely writes an individual key to a meter device and safely retains the written individual key even in such a manufacturing process having a low management level.

FIG. 1 shows a hardware configuration of a meter device provided with a communicating device according to the embodiment of the present invention.

The meter device 100 is provided with: a CPU 101 serving as the communicating device, an electric-power measuring device 230, a wireless IF 220, an EEPROM (Electrically Erasable Programmable Read-Only Memory) 210, a debug port 111, a network port 112, and an AD port 115. The CPU 101 is a one-chip microcomputer.

The electric-power measuring device 230 measures the electric power consumed by equipment provided in a facility such as a user-end house or a building.

The wireless IF 220 executes wireless communication in accordance with a predetermined specification. The communication may be wireless communication in accordance with the specification of IEEE802.11 or Zigbee or may be ground communication, for example, by a 3G mobile communication system.

The network port 112 is a port for connecting a network cable such as a LAN cable and is electrically connected to a wired IF in the CPU 101. In the present embodiment, as wired communication, that of Ethernet (R) is carried out; however, the communication is not limited thereto.

The CPU 101 obtains an individual key (common key) from a key issuing server by an initializing process (described later) carried out in a manufacturing process of the meter device and writes the key to a storage unit (non-volatile memory) therein. During operation after the device is disposed in the user-end house, encrypted or authenticated communication with an application server (electric-power measuring server, electric-power managing server, or the like) is carried out with the individual key. For example, authentication with an electric-power measuring server is carried out, and measurement result data of electric power consumption is encrypted and transmitted to the electric-power measuring server.

The EEPROM 210 stores configuration information of equipment (for example, configuration information of the wired IF), measurement result data, etc.

The debug port 111 is a port for connecting a debugging device to the meter device in order to carry out debugging of software and hardware in the manufacturing process. The debug port 111 serves as a part which inputs the signals of instructions/data to a debugging function (debugging unit) provided in the CPU. The debug port 111 is electrically connected to the debugging unit in the CPU via a terminal (debugging terminal) of the CPU. When the debug port 111 and the debugging unit are utilized, access (write, read) to the non-volatile memory of the CPU 101 can be made, and instructions can be given to an instruction executing unit.

The AD port 115 is a port to be connected to an external noise generating device in order to input a noise signal for random-number generation in the manufacturing process of the meter device. The input signal is converted to a digital signal by an ADC provided in the CPU 101.

In the example shown in the drawings, the ports 111, 115, and 112 are disposed on a board of the meter device. However, the disposing positions thereof are not limited to that, and, for example, the ports may be disposed on a housing which stores the meter device.

The meter device of the present embodiment is characterized by, in the manufacturing process thereof, safely obtaining an individual key from a key managing server 2, writing the key to the non-volatile memory of the CPU 101, and safely retaining the written individual key.

Figure 2:
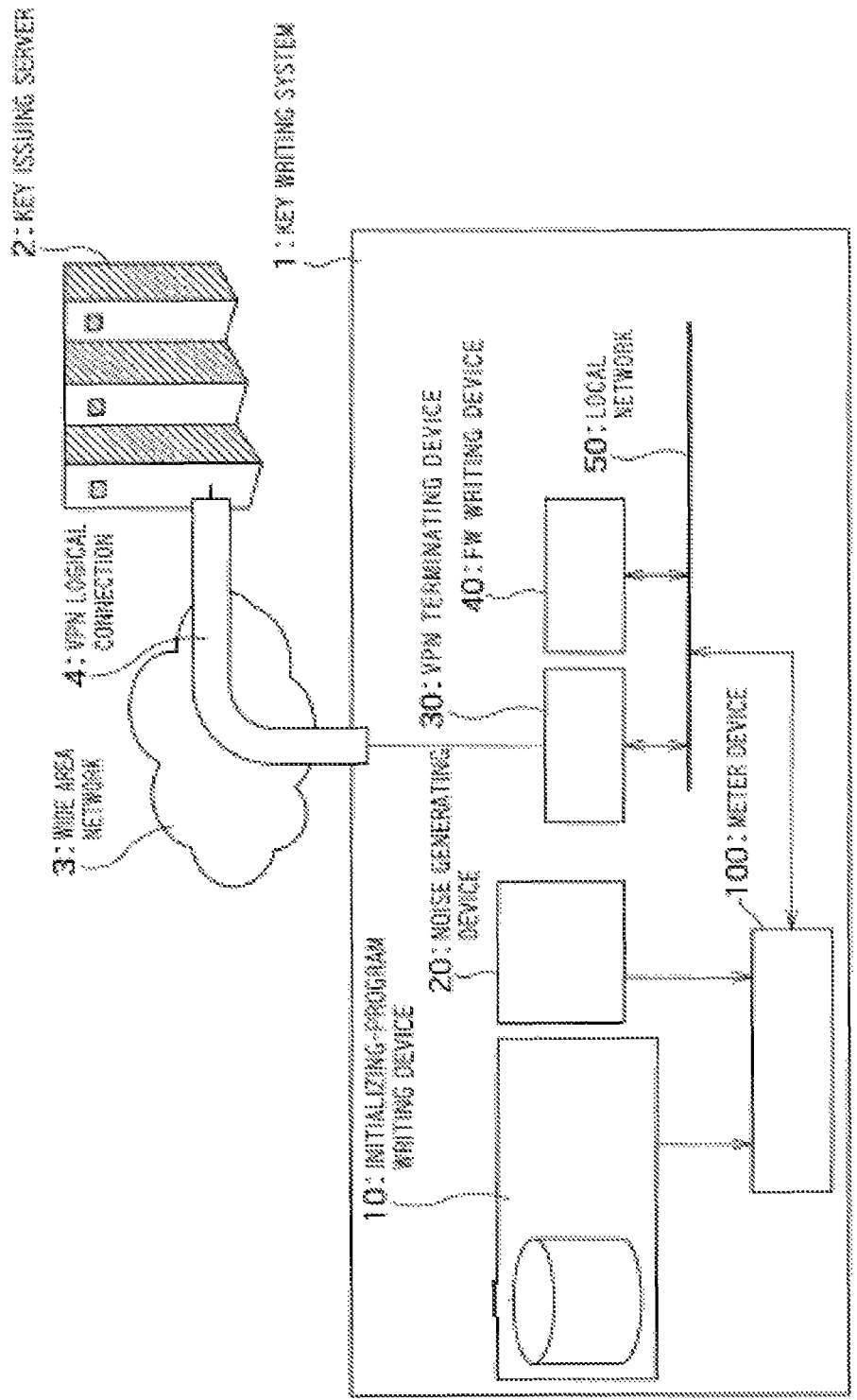
FIG. 2 is a drawing showing a configuration of a key writing system according to the embodiment.

FIG. 2 shows an entire configuration of a key writing system for safely writing the individual key to the meter device according to the embodiment of the present invention.

The key writing system 1 includes: the meter device 100 of FIG. 1, an initializing-program writing device 10, a noise generating device 20, a VPN terminating device 30, a FW writing device 40, and a local network 50. The key writing system 1 is connected to the key issuing server 2 via a wide area network 3 such as the Internet. The key issuing server 2 issues the individual key for the meter device. The key issuing server 2 is controlled in a safe place.

A VPN logical connection 4 is formed by the VPN terminating device 30 between the VPN terminating device 30 and the key issuing server 2, and the communication between the key writing system 1 and the key issuing server 2 is carried out by utilizing the VPN logical connection 4. Hereinafter, an outline of the operation in which the meter device 100 safely receives and retains the individual key from the key issuing server 2 will be explained.

First, the debug port 111 is disabled, and a random number is then generated by utilizing the noise signal from the noise generating device 20. Combined data of the generated random number and a unique identifier of the meter device is encrypted by the public key of the key exchanging server 2, and the encrypted data is transmitted to the key exchanging server 2 via the Ethernet 50 and VPN 4.

In the key exchanging server 2, the encrypted data is decrypted by a secret key corresponding to the public key, and an individual key is allocated to the meter device 100. Then, a signature of the random number is generated by the secret key, combined data of the individual key and the signature data is encrypted by the random number, and the encrypted data is transmitted to the meter device 100.

In the meter device 100, the encrypted data is decrypted by the random number to retrieve the individual key and the signature, the validity of the signature is verified based on the public key and the random number, and, when determined valid, the decrypted individual key is written to the non-volatile memory.

Then, connection to the FW writing device 40 is established via Ethernet 50, FW (software) which realizes the functions customized for each delivery destination is downloaded, and the downloaded FW is written to the non-volatile memory of the meter device. In the present embodiment, FW includes an application program having a function of collecting measurement result data measured by the electric-power measuring device 230 of the meter device 100, encrypting the measurement result data by the individual key, and transmitting the data to the electric-power measuring server or an application program which adjusts the amount of electric power supply based on a control message from the electric-power managing server.

Figure 3:
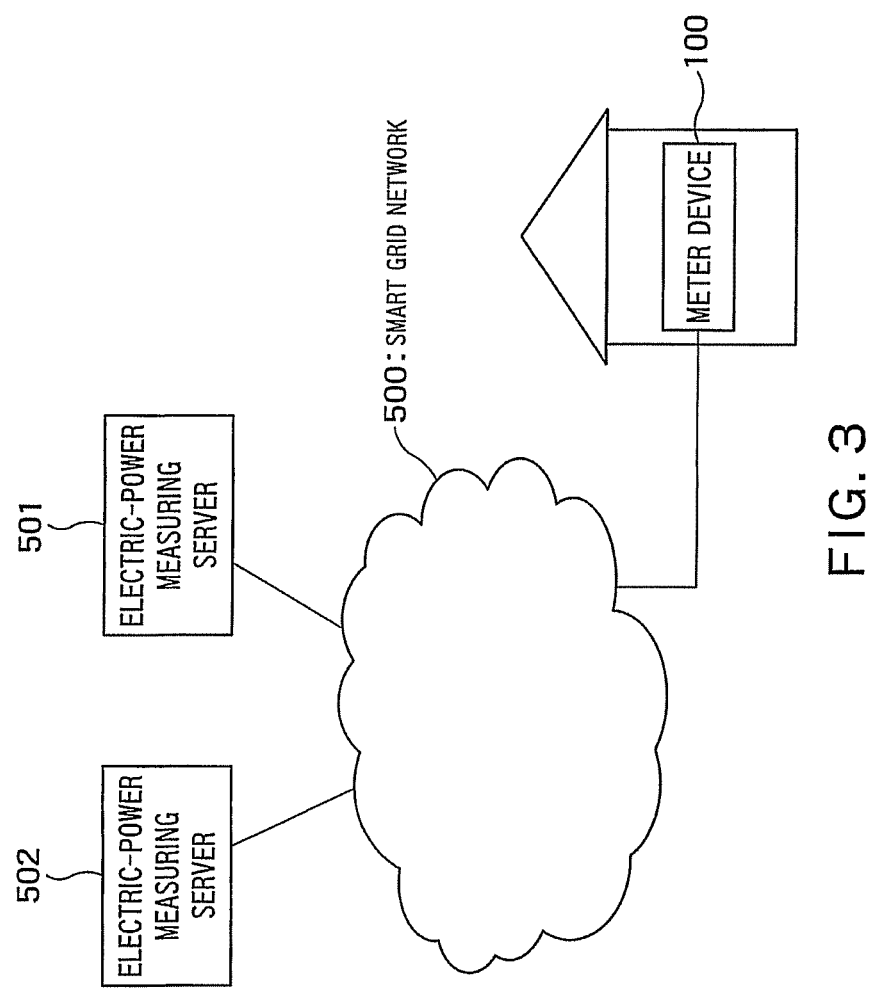
FIG. 3 is a drawing showing a configuration of a system in which the meter device according to the embodiment communicates with servers.

The meter device which has undergone the manufacturing process is shipped out and is disposed in a facility such as a user-end house or a building as shown in FIG. 3. The meter device 100 communicates with an electric-power measuring server 501 or an electric-power managing server 502 via a smart grid network 500. The electric-power measuring server 501 or the electric-power managing server 502 has a key (common key or public key pair for authentication) same as the individual key of the meter device 100. By utilizing this individual key, encryption, decryption, and authentication is carried out between the meter device 100 and the server. The electric-power measuring server 501 or the electric-power managing server 502 may be physically in the same device as that of the key issuing server 2.

Hereinafter, the configuration and working of the meter device 100 which safely obtains and retains the individual key by the initializing process will be explained in further detail.

Figure 4:
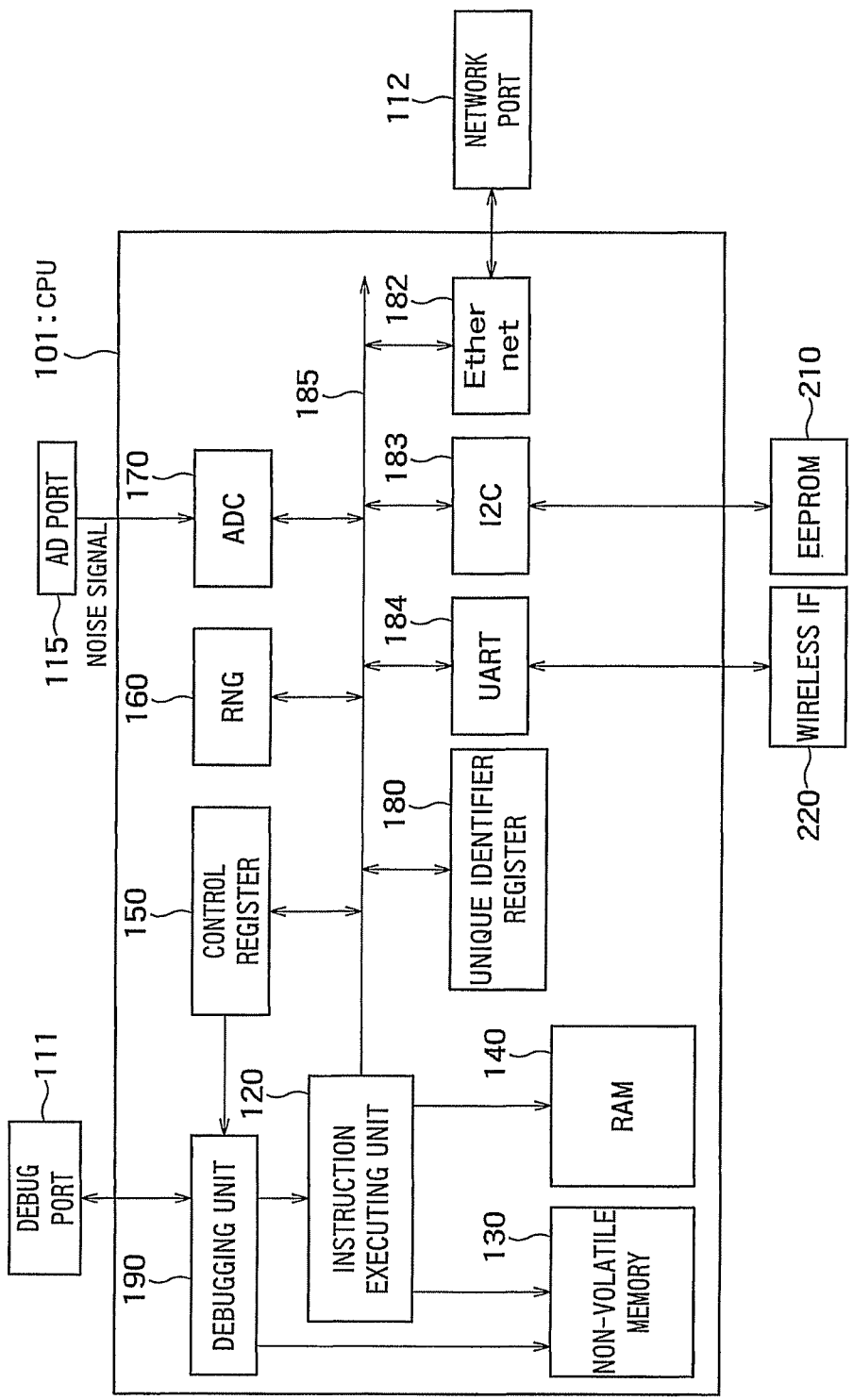
FIG. 4 is a block diagram showing a hardware configuration of a CPU (microcomputer) according to the embodiment.

FIG. 4 shows a hardware configuration of the CPU 101 (microcomputer) provided in the meter device 100 of FIG. 1.

The CPU 101 is provided with: the debugging unit 190, a control register 150, the instruction executing unit 120, the non-volatile memory 130, a RAM 140, a unique identifier register 180, a UART (Universal Asynchronous Receiver Transmitter) 184, an I2C (Inter-Integrated Circuit) 183, the wired IF 182, a random-number generating unit (RNG: Random Number Generator) 160, the ADC 170, and a bus 185. The elements 150, 160, 170, 180, 184, 183, and 182 are mutually connected via the bus. A single bus structure is shown herein; however, a plurality of buses may be mutually coupled via a controller.

The debugging unit 190 accesses the non-volatile memory 130 in accordance with the signals of instructions/data input from the external debug port 111.

The control register 150 stores a value for controlling the operation of the debugging unit 190. When a predetermined value is written to the control register 150, the function of the debugging unit 190 can be disabled so that the input from the debug port 111 is not received by the debugging unit 190. The act of disabling the function of the debugging unit 190 in this manner is sometimes expressed as "disabling the debug port 111".

The instruction executing unit 120 executes an instruction code included in a program. The instruction executing unit 120 reads a specified program from the non-volatile memory 130, deploys the program to the RAM 140, and executes the program. The RAM 140 also stores operation data generated during program execution.

The unique identifier register 180 stores a unique identifier (Chip ID) of the CPU. The unique identifier is, for example, a numerical value expressed by a predetermined number of bits.

The ADC 170 converts the noise signal, which is input from the noise generating device 20 (see FIG. 2) via the AD port 115, to a digital signal. For example, an amplitude signal of noise is converted to a bit value of, for example, 8 bits or 16 bits. Upon generation of the noise signal, the noise generating device 20 may utilize, for example, thermal noise generated therein.

The wired IF 182 (transmitting unit, receiving unit) carries out wired communication in accordance with a predetermined specification. The present embodiment shows an example in which the wired IF 182 is an Ethernet controller. In the case of the example of a key embedding system of FIG. 2, the wired IF 182 carries out communication by Ethernet with the devices on the local network 50. The wireless IF 220 (transmitting unit, receiving unit) is provided outside the chip in the example of FIG. 1; however, the IF may be provided in the chip.

The random-number generating unit 160 generates a random number in accordance with the instruction of the instruction executing unit 120. The random-number generating unit 160 retains a function which generates a predetermined pseudo random number sequence based on an input parameter in the case in which a pseudo random number method is employed. As the input parameter, a noise value which is the value of the bit signal obtained by the ADC 170 may be provided, or the value of an address specified in advance on the RAM 140 or the non-volatile memory 130 or a randomly-determined address may be provided. The configuration having a circuit which converts internally-generated thermal noise to a random number instead of the pseudo random number sequence may be employed.

Regarding the random number, other than the generation using the random-number generating unit 160, a noise value which is the value of the bit signal obtained by the ADC 170 may be used as the random number without change. In this case, the ADC 170 functions as the random-number generating unit.

When the noise value is utilized in this manner, a random number which cannot be easily guessed by a third person is obtained.

The I2C 183 carries out serial communication with the EEPROM 210 of FIG. 1 and reads and writes data to/from the EEPROM 210.

The UART 184 subjects the signal, which is to be transmitted to the wireless IF 220 of FIG. 1, to parallel/serial conversion and subjects the signal, which is from the wireless IF 220, to serial/parallel conversion.

Figure 5:
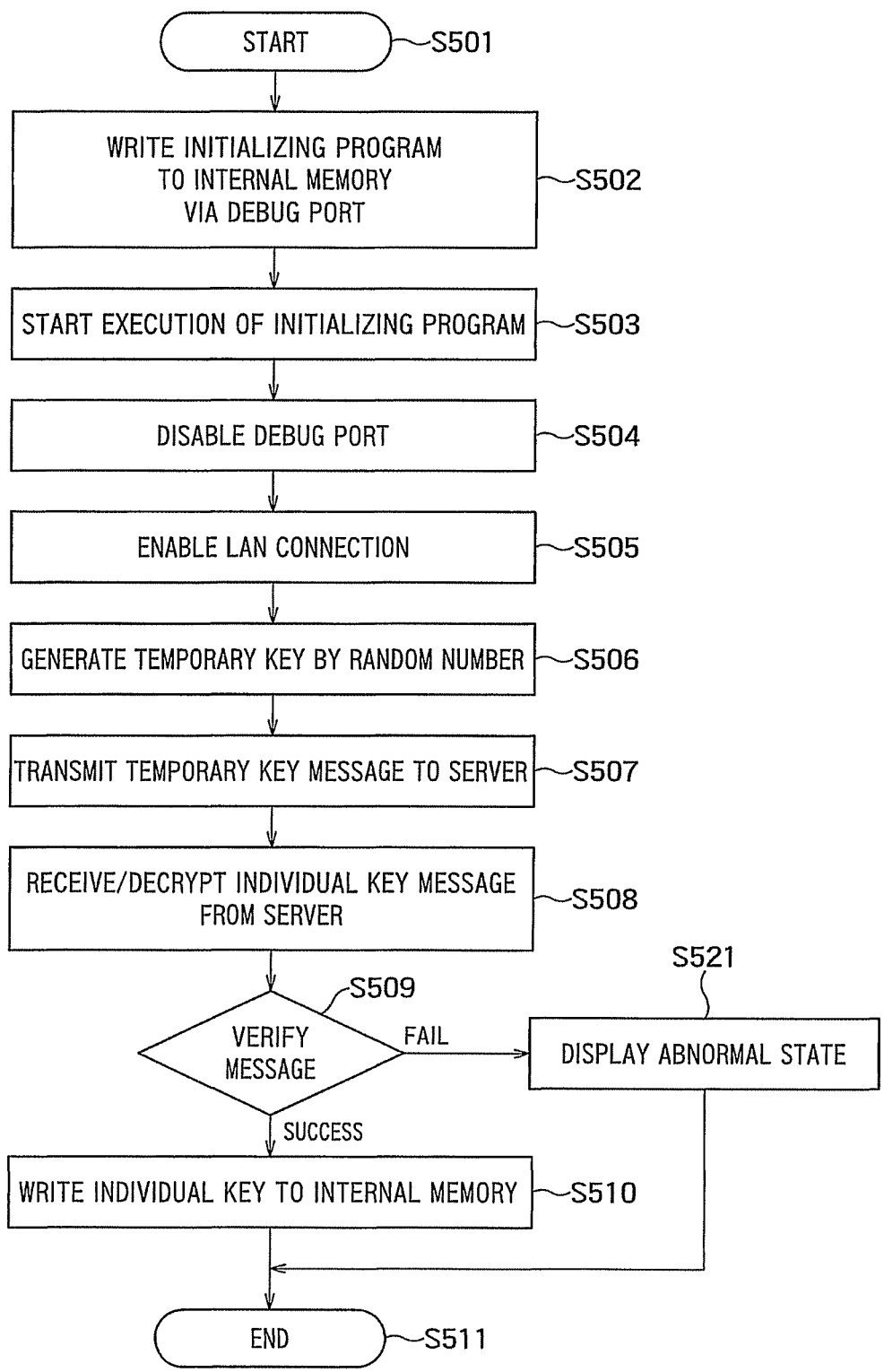
FIG. 5 is a flow chart showing an outline of an individual-key writing procedure according to the embodiment.

FIG. 5 shows an example of the flow of the initializing process by the meter device 100.

First, the meter device 100 is connected to the initializing-program writing device 10 of FIG. 2 via the debug port 111 (step S501).

Subsequently, the initializing program 12 is written from the debug port 111 to the non-volatile memory 130 in the CPU chip 101 (step S502). The initializing program 12 includes the public key of the key issuing server 2.

Subsequently, the connection between the meter device 100 and the writing device 10 is cancelled, and the instruction executing unit 120 of the meter device 100 is caused to execute the initializing program (step S503). If a resetting switch for reactivation is present, activation of the initializing program can be carried out by pressing down the resetting switch; and, if the resetting switch is not provided, the activation can be carried out by once turning off the power of the device and then turning on the power again.

When the present initializing program is executed, the following steps S504 to S511 are carried out.

First, the debug port 111 of the meter device 100 is disabled (in other words, the debugging unit 190 is disabled) (step S504). Specifically, the debug port 111 is disabled by writing a predetermined value from the instruction executing unit 120 to the control register 150 of the CPU 101. As a result, access to the non-volatile memory via the debug port 111 by unauthorized persons can be prevented.

Subsequently, communication software included as part of the initializing program is executed, thereby writing a predetermined value (MAC address, storage-destination memory address of a received packet, etc.) is written to the Ethernet controller 182. As a result, the LAN communication via the Ethernet controller 182 is enabled (step S505).

Then, a random number R is generated (step S506). The random number utilizes the random-number generating unit 160 or the conversion result of the noise signal by the ADC 170. The generated random number is used as a temporary key of the communication with the key issuing server.

Here, encrypting processes and constants used in the following explanation will be explained.

Z=EP_Kp[A]: Asymmetric encryption (for example, RSA) of data A by a public key Kp. Output is "Z".

I=V_Kp[Msg, Sig] Signature verification according to the public key Kp with respect to a message Msg and a signature Sig. Predetermined padding such as PSS is desired to be used. A verification result is represented by "I" ("1" represents successful verification, "0" represents failed verification).

Sig=S_Ks[Msg]: Signature generation by "Ks" with respect to "Msg".

Y=E_S[X]: Common key block encryption of "X" by a secret key "S". "Y" is calculated. The data size of all of "S", "X", and "Y" matches a block length. In the following embodiment, "AES128" is taken as an example, and explanation is given on the assumption that the block length is 128 bits (16 bytes); however, using a different encryption algorithm will not cause any problem.

X=D_S[Y]: Common key block decryption of "X" by the secret key "5".

ChipID: A unique identification number of a chip which can be obtained from the unique identifier register 180.

Next, a message M1 requesting the key issuing server 2 to issue an individual key is created in accordance with the following equation 1. Then, the created message M1 is transmitted to the key issuing server 2 via the Ethernet controller 182 (step S507).

$$M1=EP\_Kp[ChipID\|R] \quad \text{Equation 1}$$

The meaning of the equation 1 is described below. That is, the unique identification number (ChipID) of the chip stored in the unique identifier register 180 and the generated random number R are combined, thereby obtaining combined data. Then, the combined data is encrypted by the public key of the key issuing server 2. As a result, the message M1 is obtained.

The key issuing server 2 receives the message M1 and decrypts the message M1 by the secret key Ks corresponding to the public key Kp. Thus, "ChipID" and the random number R are retrieved. The key issuing server 2 allocates an individual key Kroot to "ChipID" and records the correspondence between "ChipID" and the individual key Kroot in a database of its own. The individual key is allocated so that the same value is not redundant among meter devices. The key issuing server 2 may transmit the recorded correspondence between the individual key Kroot and "ChipID" to a different server (electric-power measuring server or electric-power managing server) by a secure method.

Then, the key issuing server 2 generates a message M2 by following equation 2 and transmits the message to the meter device 100. As a result, the individual key Kroot is safely transmitted to the meter device 100.

$$Sig=S\_Ks[R]$$

$$M2=E\_R[Kroot\|Sig] \quad \text{Equation 2}$$

The meaning of the equation 2 is described below. That is, the random number R is signed with the secret key Ks of the key issuing server 2, thereby creating a signature Sig. A conventionally-known arbitrary algorithm can be used as the method of signing. For example, a hash value is calculated by the random number R and a hash function, and the signature Sig is obtained by encrypting the hash value by the secret key Ks.

Then, the individual key Kroot and the signature Sig are combined to obtain combined data, and the combined data is encrypted by the random number R. As a result, the message M2 is obtained.

The meter device 100 which has received the message M2 decrypts the message M2 by the retaining random number R (step S508). The individual key Kroot and the signature Sig are retrieved by the decryption.

Subsequently, verification of the signature Sig is carried out (step S509). In the case in which the signature is generated by the above described example, the verification is carried out in the following manner. First, the signature Sig is decrypted by the public key Kp to obtain a decrypted value. The hash value is calculated from the random number R by using a predetermined hash function (same as that used in the key issuing server 2). Whether the calculated hash value matches the decrypted value or not is examined. If matched, it is determined that the verification has succeeded. If not matched, it is determined that the verification has failed.

If the verification has succeeded, the individual key Kroot is written to the internal non-volatile memory 130 (step S510). If the verification has failed, the fact that the verification failed is displayed (S521). As a method of displaying the verification failure, for example, the display may be carried out by transmitting a data frame indicating an abnormal state to the terminal of an administrator via the Ethernet controller 182 or the wireless IF 220, or a buzzer may be beeped if a speaker is provided.

Then, FW (software) which realizes individual functions for each delivery destination is written to the meter device, to which the individual key has been written, by the FW writing device 40. More specifically, the initializing program receives the data of FW from the FW writing device 40 and stores the data in the RAM 140. After the contents of FW are confirmed to be authentic by signature verification, the data of FW is written by giving a transfer instruction to a write-dedicated DMA controller (not shown) while specifying the RAM address of the transfer source, the address of the non-volatile memory serving as the transfer destination, and the block size thereof for each writing unit (for example, block to 512 bytes) of the non-volatile memory 130. The interface of such writing includes several types, and the method is not limited to a particular method. The meter device of which writing has been finished is then shipped out from a factory.

In the above process, the meter device 100 communicated with the key exchanging server 2 via Ethernet; however, the communication with the key exchanging server 2 may be carried out by wireless communication by using the wireless IF 220. However, in the case with the intermediation by the wireless IF, a mechanism which does not allow third persons to intrude into the wireless network (equipment such as a radio-wave shielding room or general wireless LAN security by encryption) is required.

Figure 6:
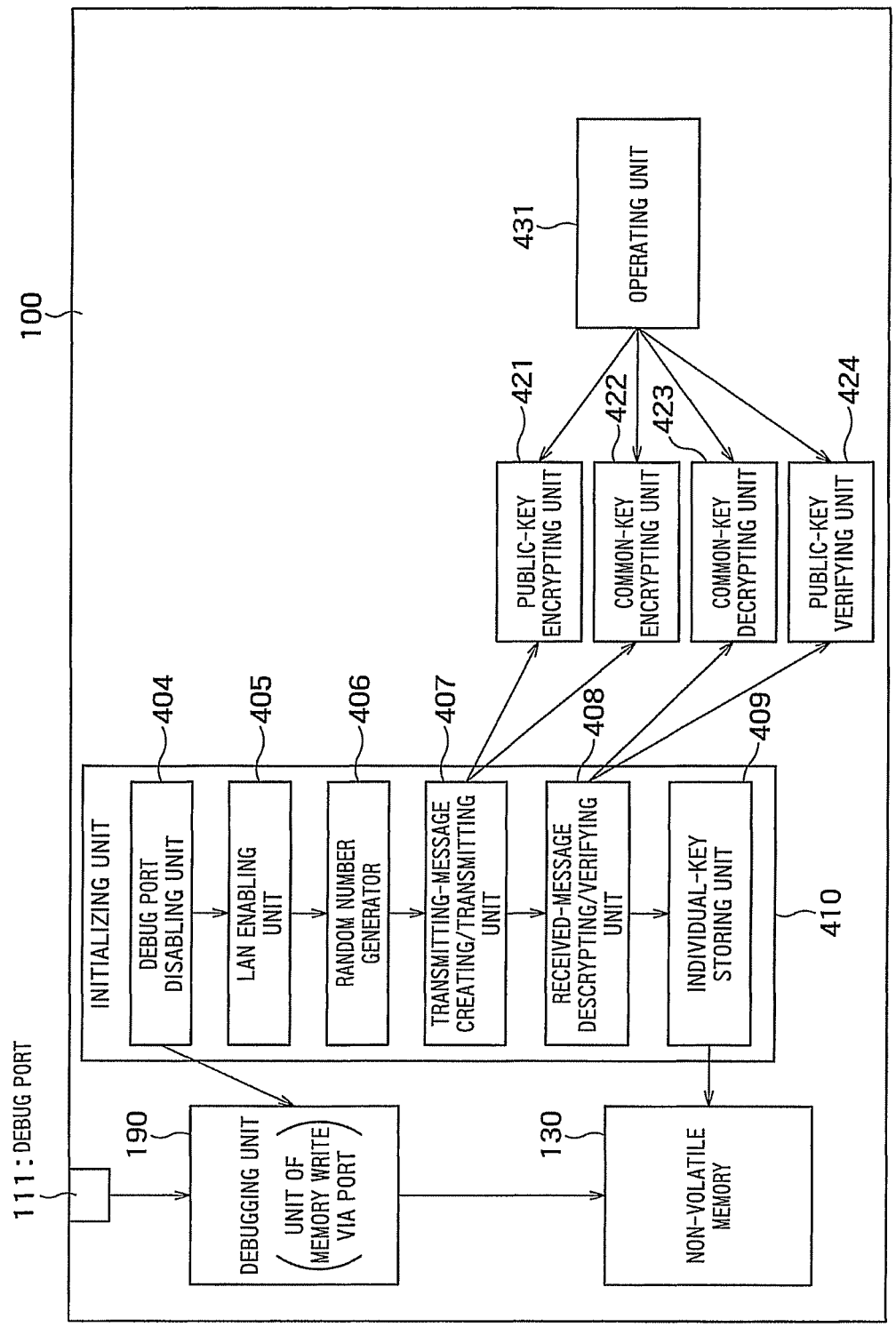
FIG. 6 is a block diagram showing a functional configuration of the meter device according to the embodiment.

FIG. 6 is a functional block diagram showing a functional configuration of the meter device according to the present embodiment.

The debugging unit 190 receives an instruction to write the initializing program and a public-key of the key issuing server from the initializing-program writing device 10 of FIG. 2 via the debug port 111. The debugging unit 190 writes the initializing program and the public key to the non-volatile memory 130.

An initializing unit 410 is substantiated by execution of the initializing program. A debug-port disabling unit (a debug disabling unit) 404 of the initializing unit 410 disables the debugging unit 190, thereby disabling the debug port.

A LAN enabling unit 405 carries out a predetermined initializing operation, writes a predetermined value (for example, MAC address) to the Ethernet controller 182, and enables Ethernet communication.

A random number generator 406 generates the random number R by utilizing the random-number generating unit 160 or the AD conversion result of a noise signal by the noise generating device 20.

A transmitting-message creating/transmitting unit 407 creates the message M1 (for example, above described M1=EP_Kp[ChipID∥R]) requesting the key issuing server 2 to issue an individual key and transmits the message to the key issuing server 2 via the Ethernet controller 182. The encryption by the public key Kp is carried out by a public-key encrypting unit 421. The public-key encrypting unit 421 encrypts "ChipID∥R" (combination of "ChipID" and the random number R) by the public key Kp and returns the encrypted data to the transmitting-message creating/transmitting unit 407.

A received-message decrypting/verifying unit 408 receives the message M2 (for example, above described M2=E_R[Kroot∥Sig], Sig=S_Ks[R]) from the key issuing server 2 and decrypts the message M2. The decryption is carried out by using a common-key decrypting unit 423, and the common-key decrypting unit 423 decrypts the message M2 by the random number R (common key or temporary key). The individual key Kroot and the signature Sig are retrieved by the decryption.

The received-message decrypting/verifying unit 408 carries out verification of the signature Sig with respect to the random number R by using a public-key verifying unit 424. The public-key verifying unit 424 carries out verification of the signature Sig by using the random number R and the public key Kp.

If the verification has succeeded, an individual-key storing unit 409 writes the individual key Kroot to the internal non-volatile memory 130. If the verification has failed, the fact that the verification has failed is displayed.

An operating unit 431 carries out communication with a corresponding server (for example, electric-power measuring server, electric-power managing server) upon operation of the meter device by utilizing the public-key encrypting unit 421, a common-key encrypting unit 422, the common-key decrypting unit 423, and the public-key verifying unit 424. For example, by using the common-key encrypting unit 422, the measurement result data obtained by the electric-power measuring device 230 of FIG. 1 is encrypted by the individual key and transmitted to the electric-power measuring server. In this process, encryption by the public key of the server may be carried out by using the public-key encrypting unit 421, or server authentication may be carried out by utilizing the public-key verifying unit 424 and the common-key decrypting unit 423.

In the above described embodiment, upon creation of the message M1, the combination of "ChipID" and the random number R is encrypted by the public key; however, only the random number R may be encrypted by the public key to transmit them without encrypting "ChipID".

The configuration in which only the random number R is encrypted by the public key and transmitted without transmitting "ChipID" can be also employed. In this case, the key issuing server is required to obtain the correspondence between the meter device and the individual key by a different method. For example, a transmission-source address described in a frame received from the meter device may be associated with the issued individual key.

According to the above described present embodiment, the individual key can be safely obtained even during the manufacturing process of the meter device, and the individual key can be prevented from being leaked to unauthorized persons or attackers.

More specifically, since the messages M1 and M2 transmitted/received via the network interface are encrypted by the public key Kp and the temporary key (random number) R, respectively, it is difficult for a person who is monitoring them to obtain effective information therefrom. Also, with respect to the attack in which an attacker impersonates an authentic verifying server, falsifies the message M2, and transmits an unauthorized key to the meter device, the message M2 includes the signature with respect to "R" hidden in advance and transmitted, and verification thereof is carried out (S509 of FIG. 5); therefore, the message falsified by the attacker who does not know the random number R does not pass the verification in the verifying step and is not accepted by the meter device.

However, impersonating the meter device and requesting key issue to the key issuing server 2 is possible in the above described communication procedure. The reason therefor is that confirming that it is an authenticate meter device by the initializing program is difficult since it is difficult to hide the initializing program 12, which is written in the manufacturing process, due to a reason in terms of above described management.

Therefore, for example, the attack in which: an attacker uniquely creates an unauthentic device not provided with the disabling of the debugging unit, brings the device into the above described production system, takes away the unauthentic device from the production system after receiving issue of an individual key from the key issuing server 2, and exposes the individual key by utilizing the debugging unit cannot be prevented by the above described mechanism alone.

However, in some cases, there is a variation of the CPU that is not provided with the disabling of the debugging unit.

However, in such a case, upon implementation of the disabling of the debugging unit, the attack can be avoided by confirming the presence of the function by the initializing software and cancelling the processes thereafter in the device that is not provided with the function.

The message M1 includes ChipID (unique identifier) of each individual CPU, and the key issuing server 2 records that. Therefore, whether the meter device is a device produced through an authentic process or not can be checked by "ChipID" by confirming whether this "ChipID" has been recorded in the key issuing server 2 or not.

As a matter of logic, there is a possibility that the initializing program 12 has been replaced by an unauthentic program. However, if the program on the initializing-program writing device has been replaced by an unauthentic program, evidence of a fraudulent operation remains. Replacing the writing device per se with an unauthentic device is difficult since the write of the initializing program is carried out via the debug port of one-to-one connection and the fraud in which the unauthentic writing device is connected in this process can be found out by appearance.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A communicating device comprising:
a storage unit;
a debugging unit configured to write a public key of a key issuing server and an initializing program originating external to the communication device, to the storage unit;
an instruction executing unit configured to read and execute the initializing program stored in the storage unit;
a random-number generating unit configured to generate a random number;
a debug disabling unit configured to disable the debugging unit by the initializing program being executed;
an enabling unit configured to enable an interface by the initializing program being executed after the debugging port is disabled; and
a public-key encrypting unit configured to encrypt the random number by the public key in the storage unit by the initializing program being executed, wherein the random number is generated by the random number generating unit and is encrypted by the public-key encrypting unit after the debugging unit is disabled and after enabling the interface by the initializing program;
wherein
the interface comprises:
a transmitting unit configured to transmit the encrypted random number to the key issuing server by the initializing program being executed; and
a receiving unit configured to receive an individual key encrypted by the random number from the key issuing server by the initializing program being executed; and
the communication device comprises an individual-key writing unit configured to decrypt the encrypted individual key by the random number to obtain the individual key and write the individual key to the storage unit, by the initializing program being executed.

2. The device according to claim 1, wherein
the receiving unit receives signature data of the random number, signed by a secret key, from the key issuing server; and
the individual-key writing unit carries out verification of the signature data based on the random number and the public key and, only when the verification succeeds, writes the individual key to the storage unit.

3. The device according to claim 1, further comprising
a unique identifier register configured to store a unique identifier; wherein
the public-key encrypting unit encrypts combined data of the random number and the unique identifier by the public key; and
the transmitting unit outputs the encrypted combined data to the key issuing server.

4. The device according to claim 1, wherein
the storage unit stores an application program; and
the instruction-executing unit carries out encrypted communication with a predetermined application server by using the individual key stored in the storage unit by executing the application program.

5. A communicating method comprising:
receiving at a debugging unit a public key of a key issuing server and an initializing program originating external to a communicating device and writing the public key and the initializing program to a storage unit;
reading and executing the initializing program stored in the storage unit;
disabling the debugging unit by the initializing program being executed;
enabling an interface by the initializing program being executed after the debugging unit is disabled;
encrypting a random number by the public key in the storage unit by the initializing program being executed, wherein the random number is generated and the encrypting is after the debugging unit is disabled and after the enabling the interface;
transmitting via the interface the encrypted random number to the key issuing server by the initializing program being executed;
receiving via the interface an individual key encrypted by the random number from the key issuing server by the initializing program being executed; and
decrypting the encrypted individual key by the random number to obtain the individual key and writing the individual key to the storage unit, by the initializing program being executed.

6. The device according to claim 1, wherein the interface is a wireless interface.

* * * * *